US011895476B2

(12) United States Patent
Buss

(10) Patent No.: US 11,895,476 B2
(45) Date of Patent: Feb. 6, 2024

(54) LOUDSPEAKER FOR HEADPHONES

(71) Applicant: Karsten Buss, Hirschhorn (DE)

(72) Inventor: Karsten Buss, Hirschhorn (DE)

( * ) Notice: Subject to any disclaimer, the term of this patent is extended or adjusted under 35 U.S.C. 154(b) by 173 days.

(21) Appl. No.: 17/628,567

(22) PCT Filed: Jul. 24, 2020

(86) PCT No.: PCT/DE2020/100657
§ 371 (c)(1),
(2) Date: Jan. 20, 2022

(87) PCT Pub. No.: WO2021/013310
PCT Pub. Date: Jan. 28, 2021

(65) Prior Publication Data

US 2022/0264227 A1 Aug. 18, 2022

(30) Foreign Application Priority Data

Jul. 25, 2019 (DE) ......................... 102019120141.1

(51) Int. Cl.
*H04R 9/02* (2006.01)
*H04R 5/033* (2006.01)
*H04R 9/04* (2006.01)

(52) U.S. Cl.
CPC ............. *H04R 9/025* (2013.01); *H04R 5/033* (2013.01); *H04R 9/045* (2013.01)

(58) Field of Classification Search
CPC ......... H04R 9/025; H04R 5/033; H04R 9/045
(Continued)

(56) References Cited

U.S. PATENT DOCUMENTS

| | | | | |
|---|---|---|---|---|
| 5,940,522 A | 8/1999 | Cahill et al. | | |
| 2013/0077800 A1* | 3/2013 | Pan | ..................... | H04R 1/2811 381/74 |

(Continued)

FOREIGN PATENT DOCUMENTS

| | | |
|---|---|---|
| AT | 163574 B | 7/1949 |
| CN | 108600927 A | 9/2018 |

(Continued)

OTHER PUBLICATIONS

Anonymous, "Tune-Up Kit for Fostex Instructions" Jun. 7, 2019, Retrieved from the Internet: https://web.archive.org/web/20190607133336/http://www.lawtonaudio.com/fostextuneupinstructions.html [retrieved on Oct. 22, 2020] XP0557427373 Step 1, Step 4.

(Continued)

*Primary Examiner* — Sunita Joshi
(74) *Attorney, Agent, or Firm* — Michael Soderman

(57) ABSTRACT

The invention is based on a loudspeaker for headphones, which has a magnet (2) accommodated in a housing comprising a respective voice coil arranged in said magnet in an axially movable manner, a diaphragm, and a loudspeaker frame (3).
According to the invention, that the magnet (2) is coaxially surrounded with a ring (6), into which at least one S-shaped recess (7) is introduced, and the free front surface of the magnet (2) is provided with a disk (8), into which at least one circular recess (9) and/or a polygonal recess (10) is introduced.
By means of loudspeakers equipped according to the invention, the headphone is able even with simple sound sources, such as, e.g., a mobile radio device, an MP3 player, a tablet, or a PC, to already provide for an exceptionally good sound experience.

6 Claims, 2 Drawing Sheets

(58) Field of Classification Search
USPC .......................................................... 381/412
See application file for complete search history.

(56) References Cited

U.S. PATENT DOCUMENTS

| | | | | |
|---|---|---|---|---|
| 2018/0103309 | A1* | 4/2018 | Ozawa .................. | H04R 9/025 |
| 2019/0182586 | A1 | 6/2019 | Kim | |

FOREIGN PATENT DOCUMENTS

| | | | |
|---|---|---|---|
| DE | 102004034882 A1 | 2/2006 |
| EP | 3310073 A1 | 4/2018 |

OTHER PUBLICATIONS

Make It Easy, "The World's best headphone Grado GS2000e | by Make it easy | Medium" Oct. 18, 2016, Retrieved from the Internet: https://medium.com/@makeiteasy/the-worlds-best-headphone-grado-gs2000e-157f4267ed29 [retrieved on Oct. 21, 2020] XP055742621 The Whole Document.
Siam Review, vol. 54, No. 3, pp. 573-596, "Chladni Figures and the Tacoma Bridge: Motivating PDE Eigenvalue Problems via Vibrating Plates", 2012 Society for Industrial and Applied Mathematics, see http://www.siam.org/journals/ojsa.php; "Selected for a Viewpoint in Physics", Physical Review Letters, PRL 116, 184501 (2016); "Resolving the formation of modern Chladni figures", EPL, 111 (2015) 64004 (doi: 10.1209/0295-5075/111/64004), www.epljournal.org.

* cited by examiner

LOUDSPEAKER FOR HEADPHONES

CROSS REFERENCE TO RELATED APPLICATIONS

This application is the U.S. national stage of International Application No. PCT/DE2020/100657, filed on 2020 Jul. 24. The international application claims the priority of DE 102019120141.1 filed on 2019 Jul. 25; all applications are incorporated by reference herein in their entirety.

BACKGROUND

The invention is based on an electrodynamic loudspeaker for headphones according to the species of the preamble of claim 1.

Headphones are known in a wide variety of embodiments, performances, and for a wide variety of applications. Due to the required relatively small embodiment of the installed loudspeakers, all components of such a loudspeaker are also embodied in a correspondingly small manner.

Regardless of their size and technical quality, the basic principle of each loudspeaker is to convert the electric signal received from an amplifier into sound waves.

To get as close as possible to the original sound of the sound event during the reproduction of sound events via electrodynamic loudspeakers, the electronic industry developed highly sensitive loudspeakers for headphones, so-called high-end headphones, the quality of which is definitely also reflected in their prices. And yet, such a high-end stereo headphone always provides only a reflection of that, which constitutes the original sound event. Moreover, conventional high-end stereo headphones can demonstrate their tonal benefits only in connection with a very high-quality and thus also cost-intensive sound source. This means that for a sound experience, which comes closer to the original sound, a very high-quality record player or CD player in connection with an amplifier is required. The same applies for the connection cables between the devices. The sound experience with a high-end stereo loudspeaker in connection with a high-quality sound source will nonetheless differ from the natural, original sound experience in a still clearly audible manner.

A loudspeaker, which is provided with a passive voice coil cooling, in order to increase its volume while maintaining its size, is further known. It has a magnet comprising a voice coil, which is axially movable in said magnet, a diaphragm, and a loudspeaker frame. Due to the fact that it is installed in a vehicle, its housing is formed by a part of a vehicle. The magnet is coaxially surrounded with a ring, which has a slit. The free front surface of the magnet is surrounded by a disk, in which a central opening is located (U.S. Pat. No. 5,940, 522 A).

A flat sound converter, consisting of a frame, a ring-shaped magnet system, a one-piece diaphragm comprising corresponding voice coil and a spherical diaphragm lying centrally in the magnet system comprising corresponding voice coil, also shows a similar setup. In its circumferential region, the frame has fastening holes, and circular openings in the region of the front side of the magnet (DE 10 2004 034 882 A1).

Finally, a frame for a loudspeaker is known, which consists of a front ring, a base plate, and a conical connecting part, which connects both and which has circular or polygonal openings (AT 163574 B).

The invention is based on the object of providing loudspeakers for headphones, which, compared to high-end stereo headphones, have a significantly higher quality in the representation and reproduction of the original sound of a sound event, even without the use of high-quality, cost-intensive sound sources, regardless of whether it is a single human voice, a coir, the sound of a solo instrument, of a group of instruments, or of an orchestra, so that they provide the listener with a natural sound experience, which comes much closer to the original sound.

The object is solved according to the invention by means of the characterizing features of claim 1.

SUMMARY

The invention is based on a loudspeaker for headphones, which has a magnet (2) accommodated in a housing comprising a respective voice coil arranged in said magnet in an axially movable manner, a diaphragm, and a loudspeaker frame (3).

According to the invention, that the magnet (2) is coaxially surrounded with a ring (6), into which at least one S-shaped recess (7) is introduced, and the free front surface of the magnet (2) is provided with a disk (8), into which at least one circular recess (9) and/or a polygonal recess (10) is introduced.

By means of loudspeakers equipped according to the invention, the headphone is able even with simple sound sources, such as, e.g., a mobile radio device, an MP3 player, a tablet, or a PC, to already provide for an exceptionally good sound experience.

DETAILED DESCRIPTION

The description of the invention and of its advantages is to be preceded by the fact that for a long time, the inventor has been dealing with the phenomenon of the connection of shape and forms with tones and sounds, about which Ernst Florens Friedrich Chladni (1756-1827) first talked about in his paper "Discoveries about the theory of the sound", which was published in 1787. In this paper, he presented the results of his systematic analyses and experiments relating to the forming, shaping forces of the tones and sounds, which he gained from a relatively simple experiment. A thin plate sprinkled with fine sand is bowed on its front side with a violin bow. After a certain time, a tonal sound can be heard and it can be seen, how the plate and the sand begin to move. If this is done with a certain amount of skill, the sand forms into a filigree pattern, which is referred to today as "Chladnic sound figures". Years later, this phenomenon was picked up and further developed by the physicist Michael Faraday (1791-1867). Instead of sand, he preferably used very fine, light powder, and came to the surprising conclusion that not only the plate has the sole share in the creation of the forms, i.e. the sound figures, but also the air surrounding the powder. The air is likewise set into vibration, i.e. rhythmic movement, by the tone. Even though numerous scientific publications relating to these experiments have been made so far and are still being made as well, the phenomenon has not yet been finally resolved. However, it convincingly shows the connection, i.e. the relation, between tone, sound, and forms. Three citations are worth mentioning here as examples for current scientific publications: SIAM REVIEW, Vol. 54, No. 3, pp. 573-596, "Chladni Figures and the Tacoma Bridge: Motivating PDE Eigenvalue Problems via Vibrating Plates", 2012 Society for Industrial and Applied Mathematics, see http://www.siam.org/journals/ojsa.php; "Selected for a Viewpoint in Physics", Physical Review Letters, PRL 116, 184501 (2016); "Resolving the formation of modern Chladni figures", EPL, 111 (2015) 64004 (doi: 10.1209/0295-5075/111/64004), www.epljournal.org.

The invention described below is a utilization of this principle, i.e. the influencing of tone and/or sound by basic forms, which are based on Chladnic sound figures, or in other words, which are gathered from the wealth of forms of Chladnic sound figures, and which demonstrably effect an influencing of the sound radiation of the loudspeaker, thus bring about a technical effect, when designed according to the invention and attached to the loudspeaker.

As has been shown in practical experiments with the wealth of forms of the Chladnic sound figures, it is possible, by arranging very specific, mainly flat forms, which thus extend in the plane, at the magnets of the loudspeakers of conventional headphones, to significantly improve the sound thereof. The tone or sound perceived from the left and/or right loudspeaker reproduces the original tone or sound of the spoken word of the human voice, of a choir, of an instrument, of a group of instruments, or of an orchestra so true to the original that the listener has the impression of hearing the tone or sound directly from the original source, such as in a live event or a live concert. By means of loudspeakers equipped according to the invention, the headphone is even able, even with simple sound sources, such as, e.g., a mobile radio device, an MP3 player, a tablet, or a PC, to already provide for an exceptionally good sound experience. A further increase of the listening pleasure by means of a high-quality sound source is obviously possible, but just not a prerequisite.

According to the invention, the magnet of the loudspeakers of a headphone is coaxially surrounded with a ring, into which at least one S-shaped recess is introduced. The free front surface of the magnet is provided with a disk, into which at least one circle and/or a polygonal recess are introduced.

By means of the attachment of a respective ring-shaped and a disk-shaped form element, in each case provided with recesses, to the magnet of the two loudspeakers of the headphone, the above-described significant sound improvement is attained. The form elements are essentially designed so that they adapt to the form of the magnet as well as of the electrical connections of the voice coil, i.e. that they have larger contact surfaces with the magnet, if possible. In the case of the cylindrical form of the magnet, this does not represent any special requirements insofar as the complete circular form of the free front surface of the magnet as well as the closed ring-shaped jacket surface thereof as well as parts of a circular form or of a ring, i.e. an arc, represent basic forms of Chladnic sound figures. The recesses introduced into the form elements likewise consist of arcs, composite arcs and/or polygonal forms, which are gathered from the wealth of forms of Chladnic sound figures. The ring form is created in that two arcs with opposite curvature are connected to one another on their two free ends, the two arcs are thus located opposite one another in a plane after their connection.

In an advantageous design of the invention, the wide ring surface, into which the at least one S-shaped recess is introduced, extends in the radial direction, so that the ring bears on the loudspeaker frame with this wide ring surface. Another possibility for the positioning and design of the ring is that the wide ring surface extends coaxially to the magnet in the axial direction.

In an additional advantageous design of the invention, three S-shaped recesses are introduced into the ring at an even angular distance from one another. The S-shape is created in that two arcs with opposite curvature are in each case arranged in a row with their free ends, i.e. an arc with concave curvature is attached to an arc with convex curvature, the two arcs thus lie one behind the other in a plane after the connection.

For purely practical reasons, the ring is provided with a recess in the region of the electrical connections of the voice coil.

It goes without saying that the sound-improving attachment elements, in the case of the present invention the ring and/or the disk, must consist of a sound-amplifying material having good sound and/or resonance properties, of which wood is likely one of the most suitable materials. However, other natural materials, such as, e.g., horn or shell, also appear to be suitable for this purpose. It is also conceivable, however, to make the form elements of a composite material.

In a further improvement design of the invention, additional form elements in the form of recesses are introduced into the disk, which is arranged on the free front surface of the magnet, whereby at least one of these form elements consists of an S-shaped recess and/or of two intersecting S-shapes.

Further advantages and advantageous designs of the invention can be gathered from the following description, the claims, and the drawings.

BRIEF DESCRIPTION OF THE DRAWINGS

A preferred exemplary embodiment of a loudspeaker according to the invention for a headphone is illustrated in the drawings and will be described in more detail below, in which.

DETAILED DESCRIPTION OF THE PREFERRED EMBODIMENTS

Figure 1:
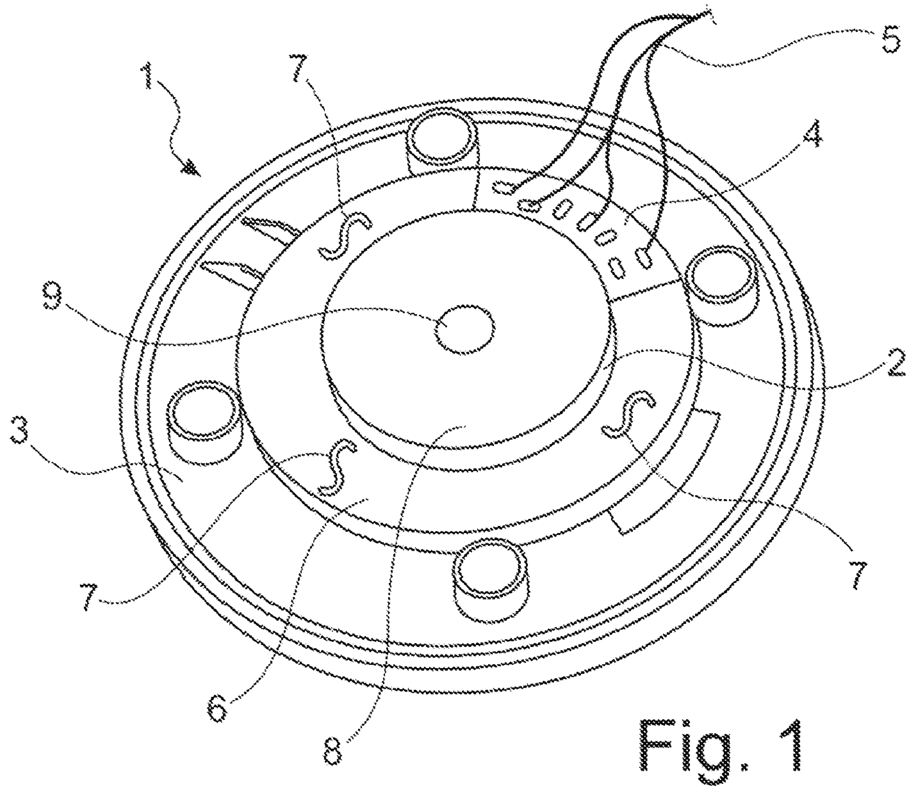
FIG. 1 shows a first embodiment of a loudspeaker of a headphone with a view of the rear side thereof.
Figure 2:
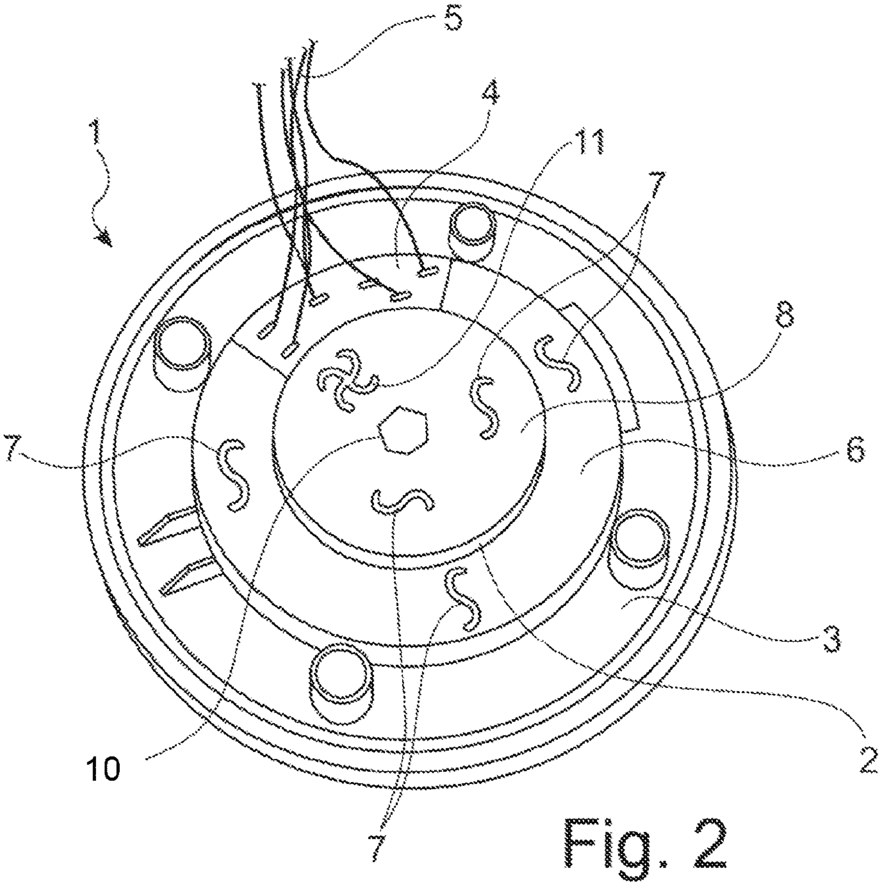
FIG. 2 shows a second embodiment of a loudspeaker of a headphone with a view of the rear side thereof.

FIGS. 1 and 2 in each case show a loudspeaker 1 of a headphone with a view of the rear side thereof. The loudspeaker 1 consists of a magnet 2, a loudspeaker frame 3, and a voice coil, which is coaxially arranged in the magnet 2, but which is not visible in FIGS. 1 and 2. A clamping part 4 for the electrical connections 5 of the voice coil is located on the rear side of the loudspeaker frame 3. On its jacket surface, the magnet 2 is coaxially surrounded by a thin-walled ring 6, which bears on the rear side of the loudspeaker frame 3. In the present example, the ring 6 consists of wood and has a recess in the region of the clamping part 4. Three S-shaped recesses 7 are introduced into the ring 6 itself at an even angular distance from one another. The free front surface of the magnet 2 is provided with a disk 8, which has a circular recess 9 in the central region of the voice coil in the first embodiment shown in FIG. 1, and a polygonal recess 10 in the form of a hexagon in FIG. 2. In the embodiment shown in FIG. 2, this disk 8 is additionally also provided with two S-shaped recesses 7 and a double-S-shaped recess 11, which consists of two intersecting mirrored S-shapes. In the present example, the disk 8 likewise consists of wood.

Figure 3:
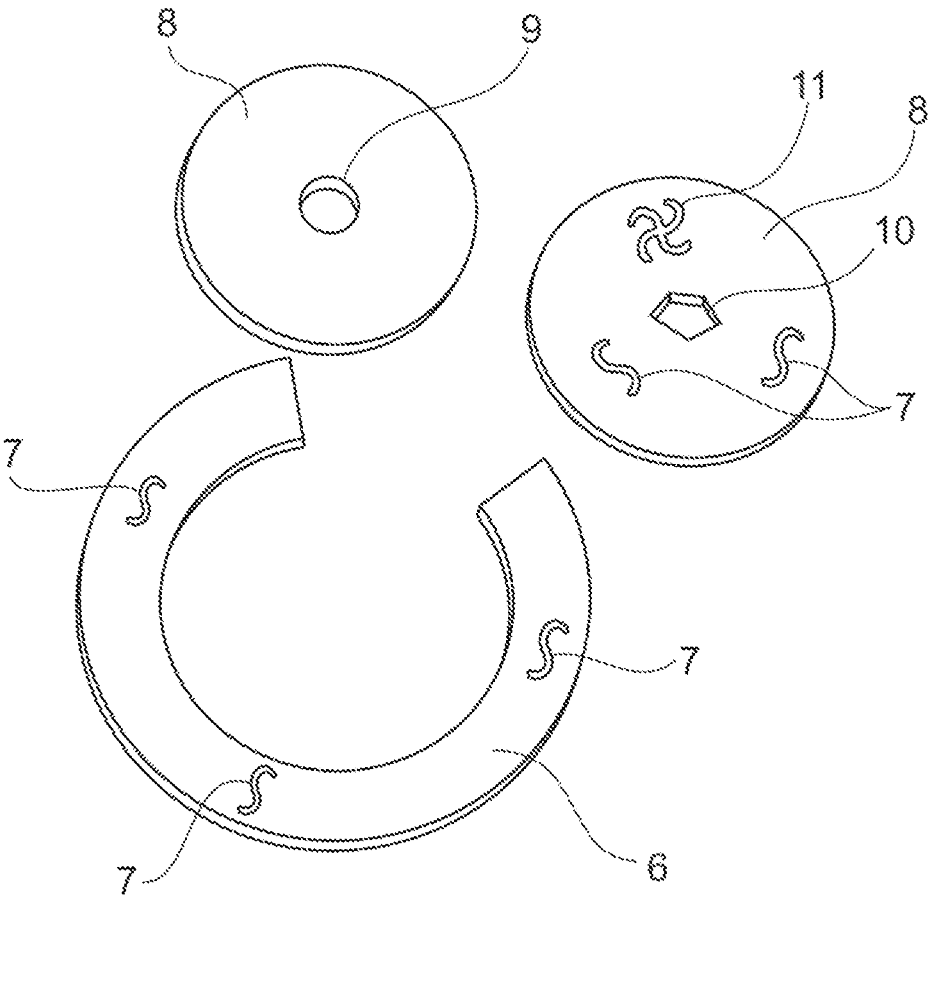
FIG. 3 shows three different attachment elements for the loudspeakers of the headphone.

In FIG. 3, the attachment elements of the loudspeaker, namely the ring 6 as well as the disk 8, are illustrated individually. In the case of the ring 6, the S-shaped recesses

7 thereof can be seen. The disk 8 is illustrated in two embodiments, namely with the central circular recess 9, and in the second embodiment with the polygonal recess 10 in the form of a pentagon as well as the additional S-shaped recesses 7 as well as the double-S-shaped recess 11, which consists of two intersecting mirrored S-shapes. The circular recess 9 as well as the polygonal recesses 10 do not mandatorily need to be arranged in the center of the disk.

All of the features illustrated here can be significant for the invention, both individually and in any combination with one another. It is in particular important to point out that the form elements shown here, namely the S-shaped recesses 7, the circular and polygonal recesses 9, 10, as well as the double-S-shape 11 only represent a selection of the forms, which are captured by the wealth of forms of the Chladnic sound figures.

LIST OF REFERENCE NUMERALS

1 loudspeaker
2 magnet
3 loudspeaker frame
4 clamping part
5 electrical connections
6 ring
7 S-shaped recess
8 disk
9 circular recess
10 polygonal recess
11 double-S-shaped recess

The invention claimed is:

1. A loudspeaker for headphones, having a magnet (2) accommodated in a housing comprising a respective voice coil arranged in said magnet in an axially movable manner, a diaphragm, and a loudspeaker frame (3), characterized in that the magnet (2) is coaxially surrounded with a ring (6), into which at least one S-shaped recess (7) is introduced, and that the free front surface of the magnet (2) is provided with a disk (8), into which at least one circular recess (9) and/or a polygonal recess (10) is introduced, wherein the ring (6) and the disk (8) consist of a sound-amplifying material having good sound and/or resonance properties, wherein the ring (6) bears on the loudspeaker frame (3) with its wide ring surface, into which at least one S-shaped recess (7) is introduced.

2. The loudspeaker according to claim 1, characterized in that three S-shaped recesses (7) are introduced into the ring (6) at an even angular distance from one another.

3. The loudspeaker according to claim 1, characterized in that in the region of the electrical connections of the voice coil, the ring (6) has a recess.

4. The loudspeaker according to claim 1, characterized in that the ring (6) and/or the disk (8) consist of natural materials, for example, wood, horn, or shell, or a composite material.

5. The loudspeaker according to claim 1, characterized in that additional recesses are introduced into the disk (8).

6. The loudspeaker according to claim 5, characterized in that the additional recesses consist of at least one S-shaped recess (7) and/or a double-S-shape (11) in the shape of two intersecting S-shapes.

* * * * *